United States Patent [19]
Grenning et al.

[11] Patent Number: 5,706,333
[45] Date of Patent: Jan. 6, 1998

[54] METHOD AND APPARATUS FOR ANALYZING CELLULAR TELEPHONE NETWORK

[75] Inventors: James W. Grenning, Hawthorn Woods; Robert L. Fawley, Mundelein, both of Ill.

[73] Assignee: Teradyne, Inc., Boston, Mass.

[21] Appl. No.: 393,764

[22] Filed: Feb. 24, 1995

[51] Int. Cl.$^6$ .................. H04Q 7/20; H04Q 7/34
[52] U.S. Cl. .................. 379/59; 379/58; 379/1; 379/29; 379/34; 455/33.1; 455/67.1
[58] Field of Search .................. 379/1, 34, 32, 379/27, 29, 58, 59; 455/33.1, 67.1, 67.4

[56] References Cited

U.S. PATENT DOCUMENTS 5,095,500   3/1992   Tayloe et al. .................. 379/32

FOREIGN PATENT DOCUMENTS 2 232 850   10/1989   United Kingdom .
2232850     10/1989   United Kingdom .
92/07429    4/1992    WIPO .

OTHER PUBLICATIONS

*CSM8000 Cellular System Monitor*, Smith Myers Communications Ltd.

Primary Examiner—Dwayne Bost
Assistant Examiner—Nay Maung
Attorney, Agent, or Firm—Edmund J. Walsh

[57] ABSTRACT

A cellular telephone network with the capability to detect faulty cellular telephones in use in the network. The network includes measurement units at some or all of the cell sites. The measurement units monitor the radio links between each cell site and specific cellular telephones. Measurements taken at all the cell sites are accumulated at a test system controller. The test system controller stores and processes the measurements to detect faulty cellular telephones. When a faulty cellular telephone is detected, a trouble manager notifies the subscriber of the fault so that it might be repaired before the fault affects cellular telephone service. The same measurement techniques are also used to detect fraudulent telephone usage and network problems.

6 Claims, 5 Drawing Sheets

MEASUREMENT DATA BASE

| MIN ESN SCM | CELL SITE | CHAN NUMS | DATE TIME | RF FREQ., POWER | SAT CODE, FREQ. | SAT DEV. | ST FREQ. DEV. | FSK DEV. | DTMF FREQ. | NOISE (dB) | S/N |
|---|---|---|---|---|---|---|---|---|---|---|---|
| MIN ESN SCM | CELL SITE | CHAN NUMS | DATE TIME | RF FREQ., POWER | SAT CODE, FREQ. | SAT DEV. | ST FREQ. DEV. | FSK DEV. | DTMF FREQ. | NOISE (dB) | S/N |
| MIN ESN SCM | CELL SITE | CHAN NUMS | DATE TIME | RF FREQ., POWER | SAT CODE, FREQ. | SAT DEV. | ST FREQ. DEV. | FSK DEV. | DTMF FREQ. | NOISE (dB) | S/N |

CALL PROCESSING FAILURE DATA BASE

| MIN | ESN | CELL SITE | CHANNEL | DATE | TIME | ANALOG/ DIGITAL | FAILURE TYPE |
|---|---|---|---|---|---|---|---|
| MIN | ESN | CELL SITE | CHANNEL | DATE | TIME | ANALOG/ DIGITAL | FAILURE TYPE |
| MIN | ESN | CELL SITE | CHANNEL | DATE | TIME | ANALOG/ DIGITAL | FAILURE TYPE |

METHOD AND APPARATUS FOR ANALYZING CELLULAR TELEPHONE NETWORK

This invention relates generally to cellular telephone networks and more particularly to network management functions for cellular telephone networks.

Cellular, or mobile, telephones have become very popular recently. Many cars are equipped with cellular telephones and many people now carry portable telephones with them. Cellular telephones may be used to place or receive calls anywhere within the service area of a compatible cellular telephone company.

The service area is divided into "cells." Within each cell is a base station. The base station establishes a radio link to every cellular phone within the cell which is either placing or receiving a telephone call. The base station connects to a network controller, sometimes called a "Mobile Telephone Switching Office" or "MTSO." This connection is generally made through a cable or microwave link over which multiple telephone calls can be transmitted simultaneously. The network controller connects to the normal land line network as conventionally used to carry telephone calls.

To place a call, a radio link is established from the cellular phone to the base station. Links are then established from the base station to the network controller and from the network controller to the normal land line telephone network. One complexity is introduced because the cellular phone can move during a call. If the phone were to move out of the cell in which the call started, the cellular phone might get too far from the base station to maintain the radio link. If the radio link fails during a call, the call will be aborted.

To avoid this problem, the level of the radio signal received from each cellular phone is monitored during a call. If the level gets too low, an effort is made to establish a better radio link between the cellular phone and a base station in an adjacent cell. When this new link is established, the link from the network controller to the base station must be changed so that the network controller is connected to the base station in radio contact with the cellular phone.

A cellular telephone network is more complicated than an ordinary telephone network which makes connection only between fixed points. Unfortunately, with this added complexity comes additional chances for a failure, such as a call being aborted or "dropped." Additionally, because the call is transmitted in part over a radio link, sound quality might be worse than can be obtained over a normal network.

Sometimes, dropped calls or poor sound quality result from problems in the cellular network. Other times, the problem is caused by an improperly operating cellular telephone. Unfortunately, it is difficult for a cellular telephone user to distinguish between these sources of problems. Regardless of whether the fault is in the cellular network or the customer's equipment, when a fault exists, the customer is likely to be dissatisfied with the cellular phone service. The dissatisfied customer is likely to use the service less or to get cellular service from a competing cellular telephone service provider. Either event results in a loss of revenue for the cellular telephone company. Also, one faulty cellular telephone can disrupt calls made by other cellular telephones.

It would be highly desirable if a cellular telephone service provider could detect faulty cellular telephones and alert the customer of the problem before the customer becomes dissatisfied. It would also be desirable if the cellular telephone service provider could detect faults in its network and fix them before customers become dissatisfied.

It would also be desirable for cellular telephone companies to be able to detect faulty telephones which might disrupt cellular telephone service.

Another problem faced by cellular telephone companies is fraud. Since cellular telephones can be anywhere in the network when a call is placed, the only way the network recognizes which customer has placed a call is by a code programmed into each cellular telephone. However, some unscrupulous individuals have devised methods for determining codes which have been programmed into customers' telephones. They then program these numbers into their own phones and fraudulently place calls which are not billed to them. This activity is known as counterfeit fraud and is a significant problem for cellular telephone companies. Not only does the cellular telephone company lose revenue for network usage, but its legitimate customers are significantly inconvenienced in having to have the fraudulent calls removed from their bills and by having to change their cellular telephone numbers.

It would be highly desirable for cellular telephone companies to detect fraudulent usage of the network.

SUMMARY OF THE INVENTION

With the foregoing background in mind, it is an object of the invention to test subscriber telephones in a cellular telephone network.

It is also an object to test base station radio equipment in a telephone network.

It is also an object to detect fraudulent usage of a telephone network.

The foregoing and other objects are achieved with a test system controller and a plurality of measurement units. Measurement units are installed where they can monitor radio transmissions to and from cellular telephones. The measurement units measure parameters of the signals transmitted by the base station and cellular telephones. The measured parameters are passed to a test system controller. The test system controller compares the measured values to acceptable limits and stored information to detect faulty equipment. Reports of faulty equipment are passed to a trouble management system.

In one embodiment, measurements are made on each cellular telephone in a random fashion. In an alternative embodiment, cellular telephones are prioritized for testing based on such parameters as amount of use and prior history of trouble. In some embodiments, testing is performed in response to an event indicating that a possibly faulty telephone is currently in use. One such event is a customer calling to report a problem with cellular telephone service.

In yet another embodiment, test results gathered from multiple cell sites are integrated to provide a diagnosis of the cellular equipment.

In a further embodiment, the test system compares measured parameters relating to the radio transmissions and compares them to stored information to also detect potentially fraudulent use.

In an additional embodiment, the test systems measures the transmissions from the base station radio equipment to detect faults in the base station radio equipment.

In yet another embodiment, the test system monitors radio transmission characteristics and determines the noise level in the carrier audio signal.

In yet another embodiment, the test system uses data related to call processing failures in the identification of faulty cellular telephones.

BRIEF DESCRIPTION OF THE DRAWINGS

The invention will be better understood by reference to the following more detailed description and accompanying drawings in which

FIGS. 3A and 3B illustrate the structure of the data bases used by the test system controller of FIG. 1.

DESCRIPTION OF THE PREFERRED EMBODIMENT

Figure 1:
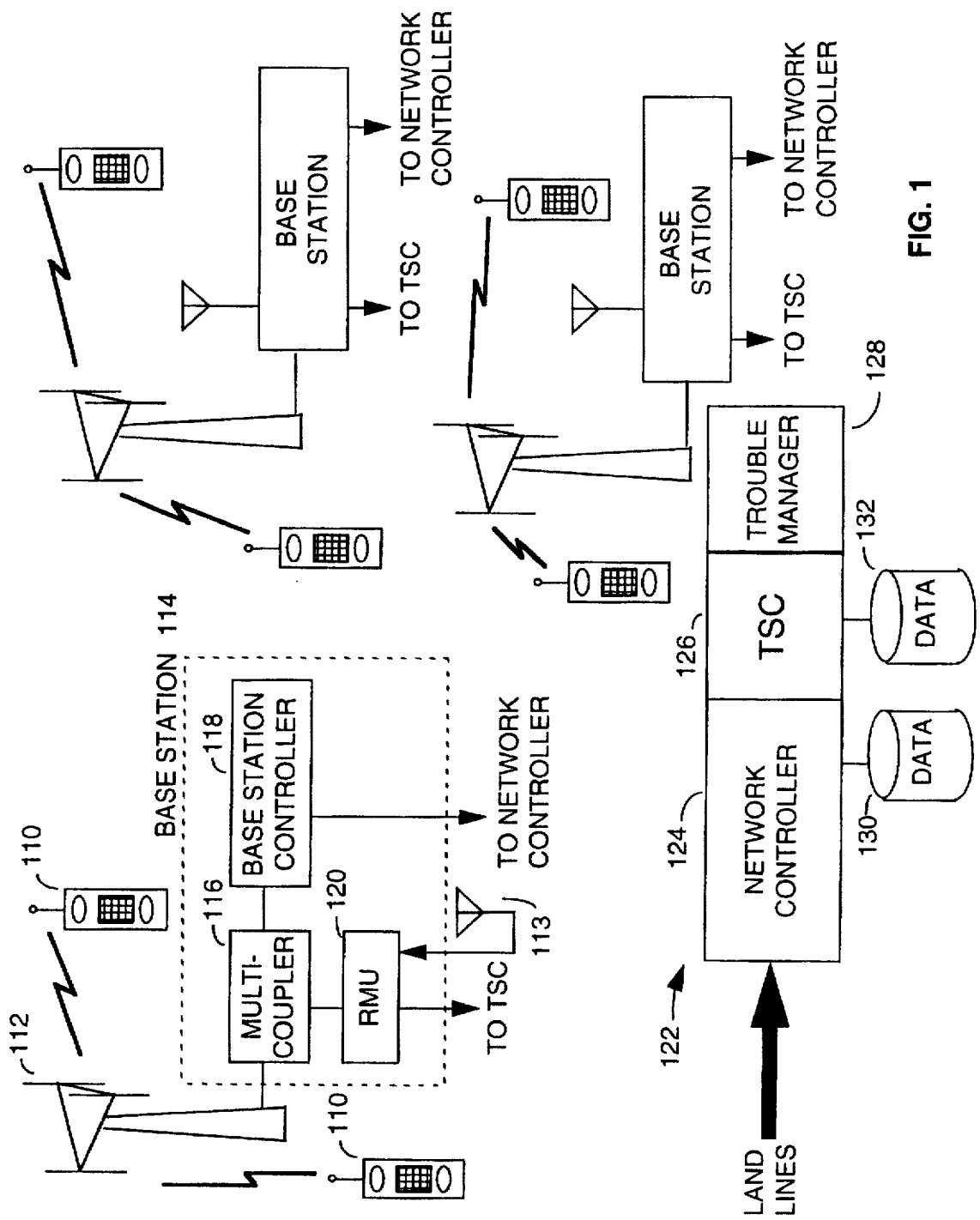
FIG. 1 illustrates a cellular telephone network employing the invention.

FIG. 1 shows a cellular network incorporating the invention. Many cellular telephones 110 may be in use in the service area of the network at one time. Each cellular telephone 110 which is in use establishes a radio link to a base station 114.

At each base station, radio signals are transmitted and received through antenna 112. Antenna 112 is connected through multicoupler 116 to base station controller 118.

Base station controller 118 is a computer controlled radio system. One set of input signals to base station controller 118 is the radio signals which represent the signals which are transmitted over the radio links to the cellular telephones 110 in contact with base station 114. The other set of inputs to base station controller 118 are digital telephone links to network controller 124. Voice information in a telephone call going to a cellular telephone 110 is sent to base station controller 118 over these telephone links where it is converted to a radio signal broadcast to the cellular telephone 110. Conversely, voice signals from a cellular telephone 110 transmitted over the radio link to base station controller are converted to digital signals which are sent to network controller 124.

Central station 122 includes network controller 124. Network controller 124 is a computer controlled switch. One set of inputs are the land lines connected to base stations 114. These lines carry telephone calls to and from cellular telephones 110. Another set of inputs to network controller 124 are land lines which connect to the ordinary telephone network. Each line carrying a call from a cellular telephone 110 is switched to one of the land lines or to a line carrying a call to another cellular telephone.

Multiple cellular telephones 110 may simultaneously establish a radio link to a base station 114 because each telephone is assigned a different frequency in a classical frequency division multiple access (FDMA) arrangement. The frequency spectrum is divided into numerous channels.

Because cellular telephones are full duplex, the voice information in a telephone call is carried in two channels: one for sending signals to base station 114 and one for receiving signals from base station 114. These channels are called the Reverse Voice Channel (RVC) and the Forward Voice Channel (FVC), respectively. Network controller 124 switches the appropriate transmit/receive pair of signals onto one land line.

Base station 114 can send and receive signals at a limited number of frequencies, i.e. it has a limited number of "channels." To make maximum usage of the network, channels are not assigned to cellular telephones 110 until a radio link is established. Network controller 124 assigns channels for use by each cellular telephone 110 as needed. Control information needed to connect a specific cellular telephone 110 to channels assigned to it is transmitted on a channel which all cellular telephones 110 receive. This channel is called the Forward Control Channel or FCC. Likewise, when a cellular telephone 110 initiates a call, it transmits information over a control channel which all cellular telephones use. This channel is called the Reverse Control Channel or RCC.

Each cellular telephone 110 is assigned a unique identifying number by the cellular telephone service provider. This identifying number is called the Mobile Identification Number or MIN. More colloquially, the MIN is sometimes called the phone number. To connect a call to a particular cellular telephone 110, base station 114 transmits a message in the FCC which contains the MIN for the cellular telephone which is to receive the call. The message also contains channel assignments for the transmit and receive channels to be used by that cellular telephone for the call. Base station controller 118 generates a single frequency tone, called the Supervisory Audio Tone, or SAT, in the FVC.

The designated cellular telephone 110 switches its receiver to the FVC and its transmitter to the RVC. It retransmits, or loops back, the SAT in the RVC. It also generates another single frequency signal called the signaling tone or ST in the RVC at specific times to signal certain events. The duration of the ST signal identifies the event being signaled.

When base station controller 118 receives the SAT in the RVC, it knows that a radio link has been established with cellular telephone 110. The ST signal tells base station controller that the cellular telephone is still on-hook, i.e. no one has answered the call. When cellular telephone 110 is placed off hook, it ceases sending the ST. This signals base station controller 118 that the link is established and the voice information for the telephone call is then transmitted.

If the call is terminated by placing cellular telephone 110 back on hook, the ST is retransmitted. When the call is terminated by base station controller 118, the SAT tone is stopped. In this way, the two signals, SAT and ST are used during the call for control purposes. They are at specific frequencies which can be filtered out from voice signals so that they are not heard by either party to the call.

Once a call is established, cellular telephone 110 is connected to transmit and receive in the voice channels. It does not monitor the control channels. However, control information might still need to be exchanged between cellular telephone 110 and base station controller 118. This information is sent as frequency shift keyed (FSK) data in the voice channels. FSK data is sometimes referred to as "wideband data." This information is sent in short bursts and is of specific frequencies so that it can be filtered from the voice information of the telephone call and is not heard by either person talking on the phone.

FSK signals sent by base station 118 generally communicate commands. FSK signals sent by cellular telephone 110 in the RVC generally acknowledge these commands. For example, base station 118 sends a command to switch to different channels and cellular telephone 110 sends an acknowledgment. As another example, base station 118 sends a command to change power levels and cellular telephone 110 sends an acknowledgment.

As a cellular telephone 110 moves within the service area of the cellular network, it might get too far from one base station 114 to have a reliable radio link. Base station 114 monitors the signal level in the RVC. When this signal level gets low, base station controller 118 sends a message to network controller 124. The message indicates which MIN has a low signal level. Network controller 124 then sends control messages to other base stations 114 which are near the base station in radio contact with that MIN. The other base stations then try to measure the signal level from that MIN. The base station which receives the strongest signal from that MIN will establish a radio link using new channel assignments for the FVC and RVC. The new channel assignments are transmitted to cellular telephone 110 as an FSK message in the old FVC. Upon receipt of this message, cellular telephone 110 establishes communications in the new FVC and RVC, as described above.

The process for establishing a radio link when a call is placed by a cellular telephone 110 is similar. The process is initiated by a message sent by the cellular telephone in the RCC, indicating it is requesting a call. However, digital messages in the RCC communicate the phone number which is being called. After a call is connected, when the user of a cellular telephone presses keys on the keypad, the pressing of keys is communicated over the RVC as sets of tones. These are the same DTMF tones used in a conventional land line network.

Communications protocols and more specific details of a cellular telephone network are described in *Mobile Cellular Telecommunications Systems*, by William Y. C. Lee, published by McGraw Hill, 1989 (ISBN 0-07-037030-3) which is hereby incorporated by reference.

Each cellular telephone 110 must be able to transmit and receive all of the signals needed to complete a cellular telephone call. In addition, it must respond appropriately to the commands sent by the base stations 114. Cellular telephones should meet the performance standards specified in *Recommended Minimum Standards for 800-MHz Cellular Subscriber Units* (EIA/IS-19-B) published by Electronics Industry Association, which is hereby incorporated by reference.

Various faults from time to time occur within a cellular telephone 110. To allow the cellular telephone service provider to detect faults in the cellular telephones 110, one or more measurement units 120 are added to the network. Preferably, each measurement unit 120 is associated with one base station 118. There should be a sufficient number of measurement units 120 in the network so that there is a high probability that at least a few calls placed by each cellular telephone using the network can be intercepted in a finite period, such as one month.

Measurement unit 120 is connected to antenna 112 through multicoupler 116. Multicoupler 116 is a directional RF device which allows signals in each RCC and RVC to be passed to measurement unit 120. Multicoupler 116 does not significantly alter the signal passed to base station controller 114.

Measurement unit 120 is also connected to antenna 113. In a manner described in greater detail below, these connections allow measurement unit 120 to gather information about the radio link between the base station 114 and a particular cellular telephone 110.

The connection to antenna 113 allows measurement unit 120 to listen to all communications from base station controller 118 in each FCC and FVC. The frequencies used for the FCC and FVC are different than the frequencies used for the RCC and RVC. Having separate antennas allows each antenna to be tuned for the frequencies it is to receive. However, any convenient methods for monitoring the radio link may be used.

Each measurement unit 120 is connected to test system controller 126. Test system controller 126 is a computer, such as a SUNsparc® work station. FIG. 1 shows that it is located in a central station with network controller 124. However, it could be physically located at any point. Connection between measurement unit 120 and test system controller 126 is preferably made over a telephone line through a modem. However, any form of connection between computers may be used.

Test system controller 126 also processes information provided by all of the measurement units 120 in the network. Based on this information, test system controller 126 identifies cellular telephones which are faulty.

Test system controller 126 interfaces to trouble manager 128. Trouble manager 128 is shown located in central station 122. However, trouble manager could be located at any point.

Trouble manager 128 could be a human which interfaces to test system controller 126 through a video display terminal or other suitable computer input/output device. For instance, many cellular telephone companies employ customer service representatives who receive calls from subscribers concerning service problems. One or more of the customer service representatives could act as the trouble manager.

When test system controller 126 reports a problem with a particular cellular telephone 110, trouble manager 128 contacts the telephone user to report the problem. The trouble manager can then arrange for repairs of the user's equipment or take other corrective action, hopefully before the user is significantly inconvenienced.

Trouble manager 128 can also input commands to test system controller 126. These commands might direct test system controller 126 to have the measurement units 120 monitor the calls from a particular MIN. These commands might also program various parameters used in test system controller 126 to control the manner in which tests are executed or to establish levels of the various measured parameters which indicate faults.

Commands to test system controller 126 might alternatively direct that measurements be made on a particular ongoing call. For example, when a user calls from a cellular telephone to report a service problem, measurements might be made on the radio link to that cellular telephone to determine whether the problem was because of a problem in the network or because of a fault in the user's cellular telephone. Calls of this type can be easily identified because cellular networks by convention include a service code, usually *611, which places a call to a customer service representative. Also, during a service call of this type, tests requiring user interaction can be run. For example, the user can be instructed to press various keys on the cellular telephone to generate tones which can be measured.

Test system controller 126 includes a user interface, such as a video display terminal and a keyboard. The user interface allows a user to specify operating parameters for the test system. For example, a user might specify error thresholds or monitoring parameters. User specified parameters are described below.

Information from trouble manager 128 might result in commands being sent by test system controller 126 to each measurement unit 120. Entry of user specified parameters might also result in commands being set to measurement units 120.

Test system controller 126 issues commands to the measurement units 120 in the network. These commands identify which MINs should be tested, how often each MIN should be tested, the operating mode of the test system and configuration information for the measurement unit 120.

Trouble manager 128 has been described as a person. Some or all of the functions which trouble manager 128 performs could be performed by a computer. Speech generation programs exist such that a computer can actually call a user to report a potential problem. Alternatively, users could be alerted to potential problems with their cellular telephones by mail. Automatic mailing systems exist. Alternatively, a notice of the potential problem could be inserted into a user's telephone bill, which is usually generated by a computer.

In the preferred embodiment, trouble manager 128 includes a person as well as a computer to preprocess information provided to the person. The computer may be the same computer which provides the functions described for test system controller 126 or a separate computer. In the preferred embodiment, the computer intercepts service calls placed by dialing *611. The computer directs that tests be conducted on the radio link with the cellular phone placing the call before the call is passed to a human customer service representative. In that way, the source of any trouble might be located quickly.

FIG. 1 shows that test system controller 126 accesses a test data base 132. As will be described hereinafter, faults are detected by applying a set of rules to measurements of parameters in the RVC and RCC of a particular cellular telephone as well as to past measurements in these channels and past reports of failures. This data about past events is stored in test data base 132. Test data base 132 is stored in any convenient nonvolatile memory, such as a computer disk drive.

FIG. 1 also shows network data base 130 connected to network controller 124. This database contains information normally used by a cellular telephone network. It includes such things as the name and address of users corresponding to each MIN. This information is used by trouble manager 128 to contact a user when a problem occurs. Data base 130 also contains information about how much time each MIN is in use. This information is used to identify which MINs should be monitored most frequently for faulty operation.

In addition network controller 124 generates information about calls which have been dropped. As described above, the ST is sent by a cellular telephone to signal the end of a call. If a call terminates without this signaling information, network controller 124 will identify the call as dropped. The information about dropped calls is also provided to test system controller 126 for use in identifying faulty cellular telephones.

Figure 2:
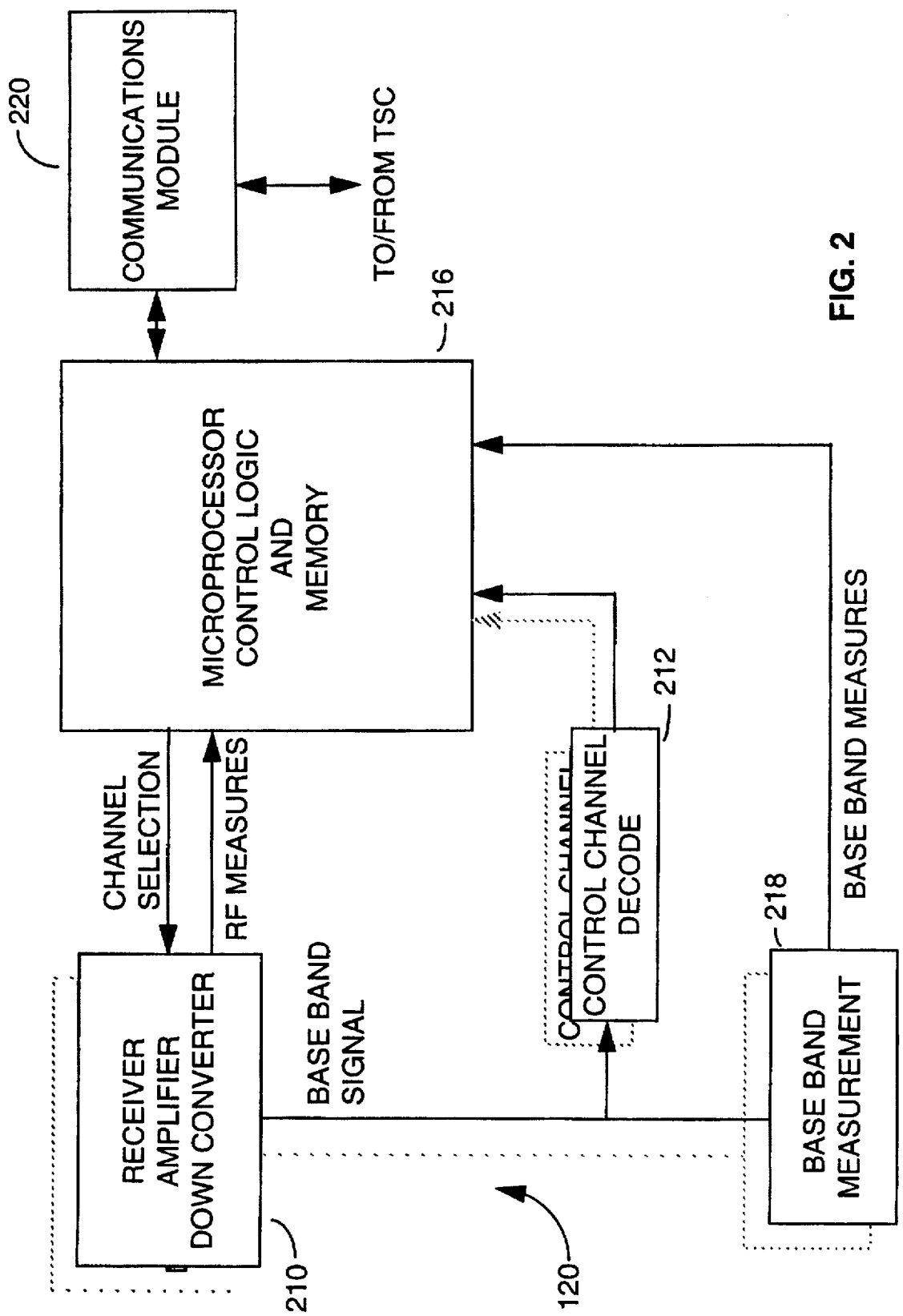
FIG. 2 is a block diagram of the hardware implementation of the measurement unit of FIG. 1.

Turning now to FIG. 2, details of measurement unit 120 are shown. Each measurement unit includes one RF receiver 210. Optionally, additional receivers may be incorporated into measurement unit 120. These additional receivers allow the control channels to be monitored while measurements are being made on one call or for multiple calls to be monitored simultaneously. Where optional receivers 210 are installed, the channels which these receivers measure are programmed into the system by the user.

Receiver 210 is a conventional RF receiver. It is coupled to antennas 112 and 113 so that it can receive both signals to and from cellular telephone 110. As in a conventional receiver, receivers 210 amplify the received signal to an acceptable level for processing. If optional receivers are present, they can be identical to receiver 210. However, if a receiver is to be dedicated to monitoring the control channels, it is not necessary to use a receiver which performs high resolution measurements. A receiver which can only detect the control information is suitable.

As shown in FIG. 1, signals to measurement unit 120 might come from one of two sources. RVC and RCC signals are received at antenna 112. FVC and FCC signals are received at antenna 113. Receiver 210 can be tuned to receive any of these signals. Receiver 210 also includes an RF switch (not shown) at its input to select between signals from antenna 112 and 113.

The received signal is down converted to a base band signal according to known RF signal processing techniques. As described above, numerous separate calls are frequency division multiplexed to create several channels. Receiver 210 down converts at a selected frequency such that its output is the base band signal in a single channel being monitored. The channel is selected based on a digital input to the receiver from microprocessor 216.

In addition to providing the base band signal, receiver 210 outputs in digital form values which represent RF parameters of the signal in the selected channel. In the preferred embodiment, these parameters are carrier signal level and carrier frequency.

Receiver 210 may be tuned to monitor the control channels used by base station 114. The base band signal out of the receiver 210 is connected to control channel decoder 212. Control channel decoder 212 converts FSK signals to fields of binary data. When receiver 210 is tuned to a control channel, the binary data represents control messages sent from or to each of the cellular telephones 110. When receiver 210 is tuned to a voice channel, the binary output of control channel decoder 212 represents the control messages sent through the voice channels.

FSK data depicts a stream of 1's and 0's. These two values are signaled by transmitting a signal which either increases or decreases in frequency by a set amount. Control messages are made up of a series of these frequency shifts. By detecting frequency shifts of the set amount, control channel decoder 212 detects the sequence of 1's and 0's.

Control channel decoder 212 groups the sequences of 1's and 0's into messages. Each message is in turn made up of fields, with each field conveying binary information. Messages are delimited by certain patterns of 1's and 0's, as are fields within a message. Control channel decoder 212 processes the stream of 1's and 0's to identify these delimiters and appropriately formats the stream into messages and fields within the message. The values of these messages are passed to microprocessor 216.

Further, control channel decoder 212 detects bit errors. FSK messages are transmitted with error detecting codes. For example, a group of parity bits is included in the transmitted message. A known algorithm is used to describe the information bits included within the message by producing a unique parity group. Upon reception of the message, a known algorithm is used to verify that the information bits agree with the parity group. Errors are reported to microprocessor 216 when the received information bits do not agree with the parity check.

Each control channel message includes a message type identifier. For example, base station 114 sends one type of message in the FCC to initiate calls. Other types of messages instruct a cellular phone to transmit and receive calls on particular channels. Likewise, a cellular telephone sends one type of message on the RCC when it wishes to initiate a call. Yet other types of messages are sent to acknowledge messages from the base station. Another type of message is sent in the FVC when the base station commands the cellular telephone to increase its transmitted power level. These different types of messages are distinguished by the value of the message type identifier in messages in the control channel or in the voice channel.

Each control message also includes bits indicating the MIN of the cellular telephone which transmitted or is intended to receive the control message.

A third portion of the message contains parameters of the command. Namely, base station 114 sends channel assignments to be used to carry voice signals in a particular call. The channel assignments are sent as parameters in the command.

The exact values sent in control messages are specified in a standard for cellular telephone networks entitled *Mobile Station-Land Station Compatibility Specification*, EIA/TIA-553, which is hereby incorporated by reference. The full set of control messages provides all information needed to determine when a call is initiated to or from a particular MIN and the channels used by that MIN to transmit and receive the signals making up that call.

Control channel decoder 212 decodes control messages and passes them to microprocessor 216. Microprocessor 216 is a conventionally available interrupt driven microprocessor. It includes control logic and memory in a conventional microprocessor architecture. Microprocessor 216 is programmed as described in greater detail below.

As each message in the forward control channel is received, microprocessor 216 processes the message. When the control message indicates that a call is being initiated, microprocessor 216 uses the information in the control message to determine whether it will monitor the call for testing. When the messages relate to a call that is to be monitored, microprocessor 216 uses the channel assignment information in the FCC messages to determine the RVC which is being used to transmit information by the cellular telephone being monitored. The channel number is passed to receiver 210 as a control input and receiver 210 is switched to that channel. Where multiple receivers 210 are optionally included, a different receiver may used to monitor the RVC.

Receiver 210 is then tuned to the RVC being monitored. The RF measurements for this channel are passed to microprocessor 216 in the same way that RF measurements for the control channel were passed. The base band signal for the monitored channel is passed to base band measurement circuitry 218. As with the case of receivers 210, multiple copies of base band measurement circuitry 218 may optionally be included in measurement unit 120. Multiple copies of base band measurement circuitry 218 allow multiple channels to be monitored simultaneously.

Base band measurement circuitry 218 performs measurements on the base band signal which will aid in the detection and diagnosis of faults. The base band signal contains voice signals, which are represented as frequency modulations. The base band signal in the voice channel also contains a supervisory audio tone (SAT) and a signaling tone (ST) at appropriate times during the call. In addition, sometimes the modulated signal is not derived from a voice, but rather from a digital source so that the modulated signal is an FSK signal.

The frequencies of the SAT and ST signals can also be measured. In addition, the frequency stability of these signals can be measured. The ST has one set frequency. The SAT could be one of only three set frequencies. If the measured signal does not contain signals at these frequencies, to within the allowed frequency tolerances, a fault in the cellular telephone is indicated. If the frequency of these signals does not stay within the allowable frequency deviation, a fault is also indicated. Moreover, large deviations, even within allowable tolerances can be symptoms of a fault or foreshadow the onset of a service affecting fault.

FSK signals in the voice channels and in the control channels are used to transmit digital control information. An FSK signal should modulate the carrier frequency by ±8 kHz from its nominal value to represent either a digital 1 or 0. Thus FSK signals at any time take on a single frequency, which could be one of a limited number of frequencies. No voice signals should be sent in the voice channel while FSK signals are being transmitted, allowing baseband measurement circuitry 218 to identify FSK signals in the voice channel. When FSK signals are identified in the voice channel and in the control channel, base band measurement circuitry 218 measures these frequencies. The measured frequencies are compared to the specification to identify any indication of a fault.

Further, each frequency shift in an FSK signal should last a specified amount of time. By measuring the duration of received signals, possible faults can be identified if the signals do not have the required timing.

As described above, base band measurement circuitry 218 includes circuitry for measuring the frequency of specific tones in the base band signal. It is therefore equipped to measure the signals, called DTMF signals, transmitted by a telephone when keys on the keypad are pressed. Each key on the keypad of a telephone has a unique combination of two tones assigned to it. These tones should be of specific frequencies, which are measured by base band measurement unit 218. In addition, these tones should be of specific duration. The duration of these tones is also measured by base band unit 218. These measurements are made with the same time and frequency measurement circuitry used to detect and measure the duration of the ST signal. Though cellular telephones do not use DTMF tones for dialing when a call is first placed, once a call is connected, the DTMF tones are transmitted when the keys on the keypad are pressed during a call.

The frequency deviation of the base band signal can also be measured. While the amount of frequency deviation depends on how loudly a person is talking into a telephone, deviations outside of an expected range tend to indicate a faulty telephone. For example, no frequency deviation over an extended period of time indicates that there is likely a fault. Very small frequency deviations could indicate that the subscriber equipment is suffering from poor signal quality.

Base band measurement circuitry 218 also includes components to measure the noise in the base band signal and the signal to noise ratio. These measurements can be made with commercially available noise filtering chips. The output of this filter, representing noise, is measured and reported in dB. It is also compared to the level of the total signal and expressed as a ratio of signal to noise.

Base band measurement unit 218 is made from conventional base band measurement circuitry in conjunction with digital control circuitry. To initiate each measurement, microprocessor 216 sends a digital command to the digital control circuitry within base band measurement unit 218. The digital control circuitry activates the conventional measurement circuitry within base band measurement unit 218 which is required to make the measurement. The result of the measurement is then passed back to microprocessor 216 in digital form by the digital control circuitry. Each set of measurements on a call is temporarily stored in memory associated with microprocessor 216.

The information stored in the memory of microprocessor 216 is occasionally uploaded to Test System Controller 126. Microprocessor 216 is connected to communications module 220 for transmitting data to Test System Controller 126. In a preferred embodiment, communications module 220 contains a modem for transmitting data over a telephone line connecting to Test System Controller 126. Communications module 220 also includes control logic which retrieves the data depicted in FIG. 3A from the memory of microprocessor 216 and transmits it to Test System Controller 126.

Transmission of data from measurement units 120 to test system controller 126 can occur as data is generated. Alternatively, it can be retrieved periodically by test system controller 126, such as hourly or daily. In a preferred embodiment, the transmissions are made daily and are scheduled to occur each night when network usage is very low. In this way, Test System Controller 126 receives the information it requires to detect faulty cellular telephones.

The result of this data transfer is a collection of databases stored in test system controller 126. These databases are used to detect faults. FIGS. 3A and 3B show the resulting data bases.

FIG. 3A shows the measurement data base. The first field in each record identifies the cellular telephone involved in the call. It includes the MIN, the electronic serial number (ESN) and the SCM.

The next field identifies the cell site, or base station, in use when the measurements were made. The next field identifies the channels used for the call when the measurements were made.

The next field indicates the date and time when the measurements were made.

The next field contains information about the RF measurements which were made. This field stores the measured carrier frequencies and the signal power level, or received signal strength indication (RSSI).

The next field stores measured values on the SAT. This field stores the SAT code, which indicates the expected SAT frequency. This field also stores the measured SAT frequency.

The next field stores the measured deviation in the SAT frequency observed over the measurement interval.

The next field stores measured information about the ST signal. It stores the measured frequency and deviation during the measurement interval. If ST timing is measured, it would also be stored in this field.

The next field stores data about FSK measurements. This field stores the measured deviation in the FSK signal in the control channel. For calls in which FSK data has been observed in the RVC, the measured deviation of those FSK signals is also stored in this field.

The next field stores DTMF frequencies. For calls in which DTMF tones have been measured, the measured values are stored in this field. This field contains a string of values, one measured frequency for each frequency used in DTMF signals.

The next field stores the measured noise level and the last field stores the measured signal to noise ratio.

FIG. 3B shows the database which is built up from call processing failure information provided to test system controller 126 from network controller 124.

The first two fields store data to identify the cellular telephone involved in the call. These values are the MIN and ESN.

The next field indicates the cell site involved. The following field indicates the channel in use at the time of the call processing failure.

The next fields indicate the date and time of the call processing failure.

The next field gives an analog/digital designation. This field tells whether the channel in use was an analog FDMA channel or a digital channel, such as a TDMA or CDMA. This information is not needed in systems which operate in only one mode, but is useful in mixed systems which can, for example, operate in a FDMA and a TDMA mode.

The final field gives a failure type. The exact values of this field depend on the internal operations of network controller 124 and the types of failures which it tracks. Each type of network controller 124, when it detects a call failure, will categorize it and this categorization is reported in this field.

Operation of the system of FIGS. 1 and 2 is described below. There are five major operations performed by the system: test scheduling, measurement, fault diagnosis, fault reporting and fraudulent use identification. Each of these operations is described below.

Test Scheduling

Figure 4A:
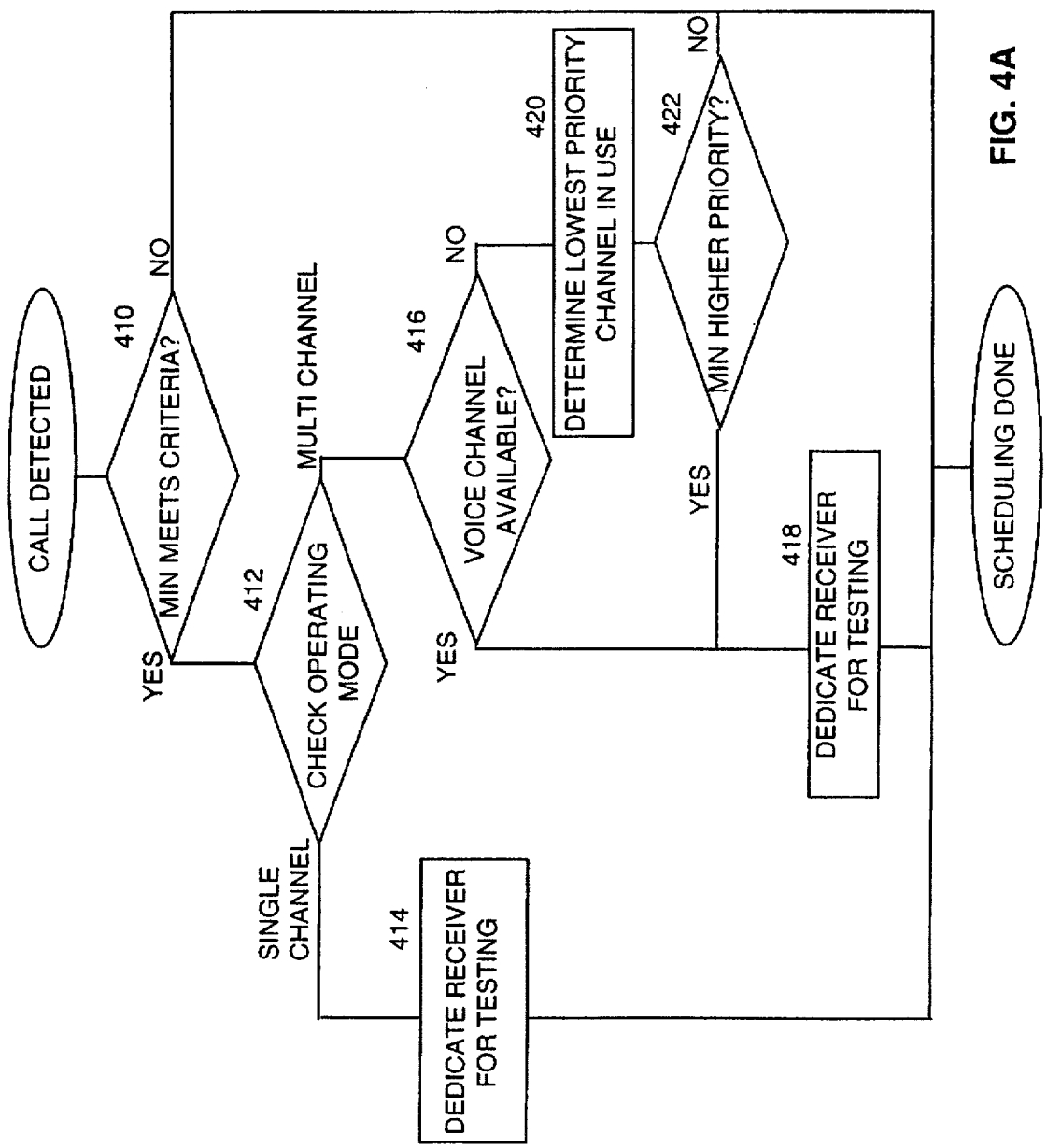
FIGS. 4A and 4B are flow charts of aspects of the operation of the test system of the invention.

FIG. 4A is a flow chart showing the test scheduling operation of the test system of the invention. Test scheduling will begin when commands in the control channel signaling the start of a new call are detected by control channel decode circuitry 212.

Execution proceeds to decision block 410. At decision block 410, available information on the cellular telephone involved in the call is compared to a set of criteria. The criteria specifies whether testing the MIN would provide useful information. The criteria are input through test system controller 126. The criteria are then communicated to all measurement units 120.

For example, a MIN indicating that the cellular telephone has an area code other than those used by cellular telephones used in this network implies that the user of the cellular network is not a customer of the cellular telephone service provider. Even if a fault were found, the cellular telephone service provider would not be able to contact users who are not customers.

Another criteria is the NXX. The NXX is the first three digits of a telephone number following the area code, sometimes called the exchange of the number. Each cellular telephone service provider is assigned a set of telephone numbers for its customers which have one of a limited number of NXXs. If a cellular telephone transmits a MIN which does not match the NXXs for the cellular telephone service provider, there is no need to test it.

Also, many areas are serviced by two cellular telephone service providers. One is termed the A service and one is termed the B service. The different services use different channels. However, cellular telephones are normally manufactured to be able to communicate with both the A and B type service. Each phone should be programmed before use to prefer the A service or the B service. When the test system of the invention is used with the A type service, cellular telephones programmed for the B type service should not be tested. Conversely, when the invention is used with a B type service, cellular telephones programmed for A type service should be rejected.

Another parameter which can be used for selecting cellular telephones for testing is the station class mark (SCM). This also is a code transmitted in control messages in the RCC. It indicates the type of cellular telephone in use. For example, portable telephone, bag type phones and car telephones all transmit different station class marks. Rejecting calls for testing based on this parameter allows a cellular telephone service company to more frequently test telephones which are more likely to have faults.

Another criteria is the number of tests conducted on that MIN in a test period. Once a cellular telephone has been tested several times in a test period, such as one day, it is unlikely that further tests will provide additional information. Limitations on available memory and processing time make it desirable to reduce the number of tests conducted. Some limit, such as 5 tests per day, is set. Once the number of measurement records for a MIN in the memory associated with microprocessor 216 reaches the limit, no further tests are conducted. Preferably, this limit is a value programmed by the cellular telephone operating company through the user interface at test system controller 126 (FIG. 1).

If the MIN does not meet the criteria for another test, scheduling is completed with no test being executed. On the other hand, if the MIN meets the criteria, execution proceeds to decision block 412.

Decision block 412 determines the operating mode of the measurement unit 120. The operating mode will be determined by the hardware present in measurement unit 120 as well as a parameter specified by the user.

When there is a single RF receiver 210, measurement unit 120 operates only in SINGLE CHANNEL MODE. When there are multiple receivers, a user may specify whether measurement unit 120 operates in a SINGLE CHANNEL MODE or a MULTICHANNEL MODE.

When operating in SINGLE CHANNEL MODE, execution proceeds to step 414. In SINGLE CHANNEL MODE, an RF receiver 210 is tuned first to monitor the control channel. When a call is detected which is to be monitored, the receiver is tuned to monitor the audio channel.

If multiple receivers 210 are present, multiple calls can be measured. However, if calls are placed while all receivers are monitoring audio channels, those calls are not detected and are not processed.

If measurement unit 120 is operating in MULTICHANNEL MODE, execution proceeds to decision block 416. In MULTICHANNEL MODE, one of the receivers 210 is assigned to always monitor the RCC. Thus, every call which is placed is detected. However, there is still a limit on the number of calls that can be measured at the same time.

Decision block 416 determines whether there is a receiver 210 which is not dedicated to monitoring the control channel or in use monitoring an audio channel. If a receiver 210 is available, execution proceeds to step 418. At step 418, the available receiver is dedicated for testing that call and testing begins.

If none of the receivers 210 are available, execution proceeds to step 420 where a priority resolution process is begun. When multichannel mode is in use, test system controller 126 (FIG. 1) builds a list of MINs which should be given a high priority for testing. Test system controller 126 has access to test data base 132, which stores data about MINs which have experienced trouble. Test system controller 126 also has access to network data base 130 through network controller 124. This data base stores information about which MINs are frequently used. Use can be measured either by total number of minutes a MIN is in use or the number of calls that a MIN has placed or received. By combining information from databases 130 and 132, test system controller 126 can determine which MINs are used by high value customers of the cellular telephone service company and which MINs are experiencing a greater number of problems per amount of usage than is average in the network. High priority MINs can thus be selected. In one embodiment, MINs in use by high value customers which have a history of trouble are given the highest priority. MINs not belonging to high value customers, but with a history of trouble are given the next highest priority. MINs belonging to high value customers which are not experiencing trouble are given the next highest priority. Other MINs are not included on the list of high priority MINs.

In the preferred embodiment, the priority assigned to each category of MINs will be programmable by the cellular telephone service company. As described above, test system controller 126 is preferably a computer work station with a user interface device so that various operating parameters may be entered. In this way, testing priorities may be assigned which are consistent with the operating philosophy of the cellular telephone service provider.

Test system controller 126 prepares the list of MINs during times of low usage of the cellular telephone network. Generally, this will occur at night. The list is then transmitted to each measurement unit 120.

At step 420, the priorities of the MINs being monitored by each of the receivers 210 are checked and the receiver monitoring the lowest priority MIN is determined. Where multiple receivers are monitoring MINs with the same lowest priority, the receiver most recently put into use is selected as the receiver monitoring the lowest priority MIN.

At decision block 422, the priority of the MIN of the detected call is compared to the priority of the lowest priority MIN being monitored. If the detected call has a higher priority, execution proceeds to step 418. At step 418, the receiver in use for testing the lowest priority MIN is dedicated for testing the detected call. Dedicating a receiver in use to test a detected call will preempt the ongoing test.

If the MIN of the detected call is of the same or lower priority than the lowest priority MIN, the scheduling routine is completed with no new test being scheduled.

An alternative way to schedule a test might be included as an option in a test system. A DEMAND TEST would be performed when a particular MIN which is believed to be faulty is communicating. A DEMAND TEST would be treated as being run on the highest priority MIN possible, so that any nondemand testing would be preempted if no other receiver was available for the demand test.

One way that a MIN could be selected for a DEMAND TEST is by monitoring calls placed to the cellular telephone service number. That number is usually *611. As the number being called is transmitted in the RCC, microprocessor 216 (FIG. 2) can determine when a call is being placed to the cellular service number and thereafter initiate a demand test.

Figure 4B:
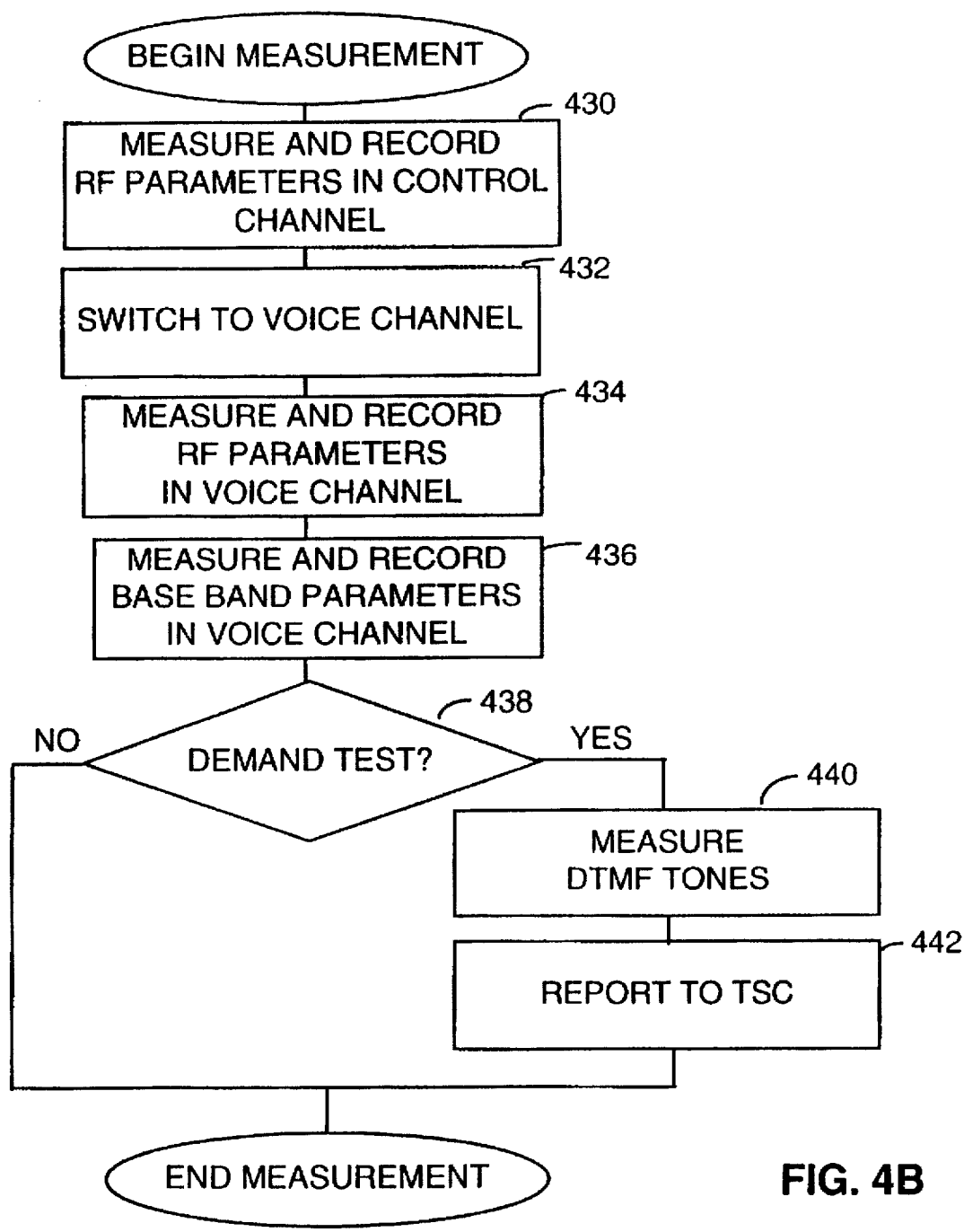

Alternatively, network controller 124 could send a message to test system controller 126 whenever it connects a call to the service center number. That message specifies the MIN involved, the base station in communication with the MIN and the channels being used for the call. Test system controller 126 can then send a message to the measurement unit 120 connected to the base station processing that call. Measurement Once a test is scheduled, execution proceeds as shown in FIG. 4B. At step 430, measurements are made of the RF parameters of the signal transmitted by the cellular telephone in its RCC. In step 430, microprocessor 216 reads RF measurement outputs from the receiver 210 monitoring the control channel. These measurements are recorded for later processing.

Execution then proceeds to step 432. At step 432, microprocessor 216 sends a command to one of the receivers 210 causing that receiver to switch to the channel being used for voice channel transmissions from the cellular telephone under test. The receiver tuned to monitor the voice channel is the receiver selected according to the scheduling routine described in conjunction with FIG. 4A.

At step 434, the RF parameters of the voice channel are measured. Microprocessor 216 reads the RF measurement outputs of the selected receiver 210. These values are stored for later processing.

At step 436, the base band parameters of the voice channel are measured. Microprocessor 216 reads the outputs of base band measurement circuit 218 connected to the selected receiver. These values are stored for later use.

Measurements of signal frequencies and deviations are made once over a window of time which is intended to give a reasonable indication of the measured parameter. Single frequency signals, like the SAT, can be measured for as short a period of time as 50 milliseconds to one second. When deviations are measured, such as the deviation of the audio portion of the baseband signal, a longer monitoring interval is sometimes required. However, monitoring time should preferably be kept short to allow many cellular phones to be monitored. Even where deviations are measured, monitoring times will be only a few seconds.

Execution then proceeds to decision block 438. Decision block 438 determines whether the test being conducted was scheduled as a demand test. If not, the measurement routine ends. On the other hand, if the test was scheduled as a demand test, execution proceeds to step 440.

A demand test can be performed in response to a call connected to the telephone network service center. These calls are first connected to trouble manager 128 before they are connected to a service technician. Trouble manager 128 sends a voice message to the user placing the service call, instructing them to press the buttons on the telephone. A message is sent to the measurement unit 120 at the base station processing that call through test system controller 126. At step 440, once this message is received, measurement unit 120 begins monitoring for DTMF signals. As each key is pressed, a different DTMF signal should be received. Measurements are made on the received signals. If no DTMF signals are detected after a set timeout period, execution terminates at this step without measurements being made.

At step 442, the demand test measurements are transmitted directly to test system controller 442. Upon receipt of these measurements, test system controller immediately performs fault diagnosis on the MIN involved in the demand test. The results of fault diagnosis are passed to trouble manager 128 as an aid in resolving the trouble call placed by dialing *611.

Fault Diagnosis

The measurements made are transmitted to test system controller 126 where they are used to build a data base as in FIG. 3A. Also, reports of call failures are sent by network controller 124 to test system controller 126. This information is used to build a data base as shown in FIG. 3B. These data bases are the main inputs for fault diagnosis.

The first step in the fault diagnosis is to filter the data shown in the data bases of FIG. 3. In the filtering operation, data related to each MIN is grouped together. Typically, grouping data by MIN will result in several records in each of the data bases in FIG. 3 for each MIN.

Old data is sorted out and deleted. Each record in the data base contains a field for time and date on which the data was collected, allowing old data to be easily identified. This filtering operation might be performed by simply rejecting data taken more than a set period of time in the past, such as three months. Alternatively, the filtering operation can be performed by saving only a fixed number of the most recent records.

Records are then combined, when possible, to make composite values of the parameters for the MIN. Many of the measured parameters should have different values in a range, depending on when they are measured. Other parameters should have at all times one of a limited number of values. For example, the received signal strength indication will vary over a wide range of values. The composite value might include only the maximum, minimum, average and standard deviation of this value. The number of measurements used to compute the value as well as other intermediate values might be stored so that running values can be computed. As for carrier frequency, it should be within a prescribed tolerance of a set value for each voice channel used. The composite values then need only to indicate the channel and the frequency deviation from the expected value for that channel. The deviation might be expressed as an average value, a maximum value and a deviation.

As to call failure data as shown in FIG. 3B, the records for each MIN can be combined into values which represent the total number of call failures over a set time interval. Also, the number of failures in each voice channel might be computed.

Which parameters are combined into composite values is dictated by how the parameters are used in fault diagnosis. Test system controller 126 performs fault diagnosis using a rule based expert system. Where rules depend on composite values, the composite values are computed prior to application of the rules.

Each MIN for which the data indicates a deviation from the specification is further processed to check for a fault in the cellular telephone. A set of rules is applied to the data for that MIN and conclusions are drawn.

Software packages to implement rule based expert systems are available. A suitable commercially available software package is CLIPS, which is sold by the United States National Aeronautics And Space Administration. CLIPS accepts a set of rules specified by a human expert. Each rule is in the form of an IF THEN statement. An example of a rule in this format is: IF received signal strength for a MIN is within 5% of minimum AND the number of dropped calls for that MIN exceeds system average THEN there is a fault in the MIN leading to low transmit power levels. The rules are developed by a human expert familiar with cellular telephone networks.

In addition, the human expert assigns a certainty factor to each rule. The certainty factor is the human expert's opinion on how often the rule holds true. In the example rule given above, the rule provides an incorrect conclusion when the monitored calls were all made while the cellular telephone was relatively far from any base station. This might lead to the expert assigning a certainty factor of 50% to this rule. The human expert takes these exceptions into account when assigning a certainty factor.

The certainty factor is also used for "debouncing". Debouncing means that an occasional measurement out of range does not trigger a false report of a fault. Conversely, an occasional measurement in the normal range should not override numerous out of range measurements. There might, for example, be multiple rules involving the same parameters but with different certainty factors. As the number of occurrences of a faulty measurement increased, the certainty factor assigned to the rule increases. Also, as the percentage of faulty occurrences increases the certainty factor of the rule also increases.

The commercial software package applies the rules to the filtered data. It combines the conclusions from the rules based on certainty factors to determine which MINs can be said with a high level of confidence to have a fault and which MINs are suspected of having a fault. The list of MINs believed to have a fault are passed to trouble manager 128. The list of MINs which are only suspected of having a fault is used to construct the list of high priority MINs for further monitoring or corrective action.

TABLE I lists rules programmed into the rule based system. In use, a set of rules is initially developed. That initial set of rules is used in a cellular telephone network for a trial period. Performance data on that set of rules is collected and rules are changed, deleted or added as a result of that performance data.

Patent application Ser. No. 08/311,802 filed Sep. 26, 1994 by Bauer et al. to a Method And Apparatus For Fault Segmentation In A Telephone Network (which is hereby incorporated by reference) describes a method by which this process can be automated. In that patent application, a rule based reasoning system is used in conjunction with a case based reasoning system. After an attempt is made to repair a fault predicted by the rule based system, a record is made of whether the rule based system correctly predicted the fault. The instances in which the rule based system incorrectly predicted a fault are stored in a separate data base. This data base, called a case base, contains instances in which exceptions to the rules apply. A case based reasoning system processes this data to attempt to identify situations in which there are exceptions to the rules. If certain rules have a large number of exceptions, it is likely that the rules need to be modified.

In addition, that application describes the use of a tree based expert system which processes historical data to determine ranges of values which correspond to fault conditions. Where the number of rules provided by a human expert proves to be inadequate, such a machine learning system may also be used to generate additional rules.

In TABLE I, the first column lists the IF portion of a rule. The second column indicates the conclusion that can be drawn. The conclusions are of three types. Some conclusions indicate a fault is present. Other conclusions indicate a fault is suspected. When faults relating to a cellular telephone are indicated as present, the conclusion is passed to the trouble manager. When a fault relating to a cellular telephone is suspected, the conclusion is used to include the MIN on the list of MINs for high priority monitoring. The third type of conclusion relates to the cellular network. These are intermediate conclusions used in diagnosing specific MINs. They are used in the IF portions of other rules. The third column contains the certainty factor which is used to combine the rules into a final conclusion.

TABLE I

| IF | THEN | CRT |
|---|---|---|
| Average value of SAT deviation exceeds allowable deviation by more than 20% | FAULT in SAT deviation | 0.50 |
| Average value of SAT deviation exceeds allowable deviation | SUSPECT SAT deviation | 0.5 |
| SAT deviation of most recent records differs from average SAT deviation by more than 20% | FAULT in SAT deviation | 0.75 |
| SAT deviation of most recent records differs from average SAT | SUSPECT SAT deviation | 0.5 |

TABLE I-continued

| IF | THEN | CRT |
|---|---|---|
| deviation by more than twice the standard deviation | | |
| The number of faulty calls exceeds limit for faulty calls for a specific cell site radio | NETWORK SUSPECT cell site radio | 0.75 |
| The number of faulty calls to cell sites which are not suspect cell sites exceeds limit for faulty calls | SUSPECT MIN | 0.85 |
| The number of faulty calls to cell sites which are not suspect cell sites exceeds limit for faulty calls, AND average power level is less than one microwatt | FAULT power level | 0.75 |
| Carrier frequency differs from nominal value by more than +/- 2.5 ppm | FAULT in carrier frequency | 0.50 |
| Carrier frequency differs form nominal value by more than +/- 1 kHz | SUSPECT in carrier frequency | 0.50 |
| FSK signals deviate by more than 10% from nominal value | FAULT in FSK data | 0.95 |
| SAT frequency differs from nominal by more than −14 or +15 Hz | FAULT in SAT frequency | 0.50 |
| SAT frequency differs from nominal by more than +/− 1 Hz | SUSPECT SAT frequency | 0.50 |
| ST frequency differs from nominal by more than +/− 1 Hz | FAULT in ST frequency | 0.50 |
| ST frequency differs from nominal by more than +/− 0.5 Hz | SUSPECT ST frequency | 0.50 |
| Maximum frequency deviation of the base band signal exceeds +/− 15.4 kHz | FAULT - overmodulation | 0.95 |
| Maximum frequency deviation of the base band signal exceeds +/− 14.7 kHz | SUSPECT - overmodulation | 0.60 |
| Minimum frequency deviation of base band signal is +/− 1.8 kHz | FAULT - under modulation | 0.85 |
| Minimum frequency deviation of base band signal is +/− 1.9 kHz | SUSPECT - under modulation | 0.85 |
| MIN has a history of failed calls between 1 and 2 times the system average in more than 5 cell sites | SUSPECT - dropped call rate | 0.70 |
| MIN has a history of failed calls greater than 3 times the system average in more than 5 cell sites | FAULT - dropped call rate | 0.90 |
| Failed call rate has increased by 100% to 200% over the last month | SUSPECT - dropped call increase | 0.50 |
| Failed call rate has increased over 200% over the last month | FAULT - dropped call increase | 0.90 |
| Failed call rate has increased by more than 50% and the airtime usage has decreased by more than 10% | SUSPECT - preventable less usage | 0.50 |

TABLE I-continued

| IF | THEN | CRT |
|---|---|---|
| At least 5 of last 10 records show suspect carrier frequency | SUSPECT - carrier frequency | 0.95 |
| At least 5 of last 10 records show fault in carrier frequency | FAULT - carrier frequency | 0.95 |
| At least 5 of last 10 records show suspect SAT frequency | SUSPECT - SAT frequency | 0.95 |
| At least 5 of last 10 records show suspect SAT frequency | FAULT - SAT frequency | 0.95 |
| At least 5 of last 10 records show suspect SAT frequency | SUSPECT - SAT deviation | 0.95 |
| At least 5 of last 10 records show suspect SAT frequency | FAULT - SAT deviation | 0.95 |
| At least 5 of last 10 records show suspect SAT frequency | SUSPECT - ST frequency | 0.95 |
| At least 5 of last 10 records show suspect SAT frequency | FAULT - ST frequency | 0.95 |
| At least 5 of last 10 records show suspect SAT frequency | SUSPECT - ST deviation | 0.95 |
| At least 5 of last 10 records show suspect SAT frequency | FAULT - ST deviation | 0.95 |

In TABLE I, rules to identify faulty and suspected MINs by comparison of measured values to standards are shown for certain parameters, particularly frequencies and frequency deviations. Similar rules are used for other parameters for which standards exist. Those rules are not expressly listed.

The rules are applied to each MIN in turn. Conclusions drawn for one MIN are generally not applicable to other MINs and are not stored after that MIN has been processed. However, some rules apply to the cellular telephone network rather than to a specific MIN. The conclusions drawn from these rules, called global rules, are saved until all MINs are analyzed.

The measurements shown in FIG. 3A, or at least a compressed version of that information, is saved for a relatively short period of time. That data is preferably saved for less than a month to reduce the total amount of memory required. More preferably, the full amount of data is saved for only two weeks.

To retain longer term historical data, an event summary data base is kept for a longer period of time. One record per month is entered into this database and the records are retained for a year. Each record in this database includes the following fields: MIN, average minutes of use, total monthly bill, date of last test, time of last test, number of tests performed during the month, number of times the cellular phone was tested without a fault, number of times that the cellular phone has been tested since detecting a fault, number of times the cellular phone has been tested since detecting a suspect condition or a fault, the longest string of consecutive tests which all reported suspect conditions, the total number of faults, the number of failed calls, the number of failed calls since last completed call; the number of consecutive calls completed since last failed call and the longest string of consecutive failed calls.

The values in these records act as accumulators. As events are detected during the current month, the appropriate values are incremented. Values representing the longest string of consecutive suspect and failed calls are reset to zero after the telephone is serviced.

Fault Reporting And Customer Interaction

When test system manager 126 identifies a MIN which is faulty, it interfaces with network controller 124. Network controller 124 accesses network data base 130 and provides test system controller 126 with the customer information, such as name, address and a home or office telephone number.

Test system controller 126 provides information on the fault as well as on the customer to trouble manager 128. Trouble manager 128 contacts the customer, using the information provided. The customer is advised of the fault and given instructions on how to have the phone repaired.

Fraudulent Use Identification

The values measured by measurement unit 120 are, as described above, used for detecting faulty cellular telephones. The same information can also be used to detect fraudulent network usage.

The parameters measured and stored for each MIN and electronic serial number ("ESN") create a signature for the cellular telephone which has been assigned that MIN and ESN. Fraudulent network usage occurs when an unauthorized user programs the same MIN and ESN into a different cellular telephone. When this happens, the RF signature for a MIN changes. Thus, besides signaling a potential fault, changes in RF parameters associated with a particular MIN can signal fraudulent phone usage.

For example, each record in the database shown in FIG. 3A includes fields which identify the cellular telephone involved in the call. The record includes not only the MIN but also the ESN. This combination of numbers should uniquely identify a single cellular telephone.

Each cellular telephone has its own unique signature which is manifested in the signals it transmits. A change in signal parameters can indicate that the same MIN and ESN has been programmed into a different telephone, possible fraudulently. For example, the SAT frequencies are all generated by a crystal within the cellular telephone. While there is variation in this frequency from phone to phone, each time that a phone is used, it should generate roughly the same frequencies. Thus, sudden changes in frequency are an indication of potential fraudulent usage of a MIN. The other measured parameters will have similar characteristic values. The SCM can also be used to identify when the same MIN has been programmed into a different cellular telephone.

The system described above stores historical measurements made on cellular telephones. The rule based reasoning system in test system controller 126 is used to compare current measurements to historical measurements and determine whether changes in measured parameters indicate a high likelihood of fraud or a suspicion of fraud. Changes in all of the measured parameters can be combined to produce a final conclusion as to which MINs are being used fraudulently. A list of MINs likely being used fraudulently is passed to trouble manager 128. In this way, fraudulent usage can be detected very quickly and stopped.

Alternative Embodiments

Having described one embodiment, numerous alternative embodiments or variations might be made. For example, test system controller 126 is shown as a single computer. The functions performed by the test system controller could be performed with a distributed processor. Those functions might be performed in the microprocessors of the various measurement units. Also, it is not necessary that the test system controller be a separate computer. The functions performed by the test system controller might, for example, be performed by the computer in network controller 124.

Various operating modes of the system were described. For example, FIG. 4A suggests that a measurement unit might be operated to prioritize MINs for testing or to test MINs on a first come, first serve basis. Both options need not be included in the same device. Benefits of the invention might be obtained if measurement units could operate in only one mode. In some instances, a measurement unit testing calls only on a first come first serve basis might be desirable because it will reduce the cost of the device.

Also, it was described that test system controller 126 prepared a list of MINs and associated priorities. Similar information might also be conveyed by preparing rules dictating how MINs are to be prioritized. The rules might then be sent to the measurement units 120 instead of the list of prioritized MINs.

As another example, it was described above that messages in the FCC channel are received through antenna 113 to determine which RVC is used by a particular cellular telephone. Antenna 113 and measurement unit 120 can also be used to make measurements on the FCC and FVC to detect faults in the cell site radio in the same fashion that they are used to detect faults in the radio of cellular telephones. Measurement units 120 would be multiplexed between testing base station radios and testing cellular telephones. Because there are generally more cellular telephones than there are channels, more time would likely be allocated to testing cellular telephones than to testing the base station radios.

To test the base station radio, receiver 210 would be tuned to the FCC to detect new calls. A scheduling process similar to the one shown in FIG. 4A would be used. For testing of a base station radio, the priority would not be that of the MIN, but of the particular base station radio channel used for the call. The priority of each channel might be allocated by the user or based on recent measurements indicating that a particular channel was suspected of being faulty. Also, call failure records stored in the data base could be analyzed for trends indicating base station faults.

Also interfaces between various computers and computer controlled devices have been described. Timing of message transmissions as well as content of the messages has been described. Many alternative interfaces can be used. For example, each measurement unit 120 could send data to test system controller 126 as measurements are made.

As another example, certain parameters were identified as being measured by measurement unit 120. These are not the only parameters which could be used. Any parameter tending to reveal faulty performance of a cellular telephone could be used. These parameters include control message content, FSK bit timing and the various timings associated with the ST functions. The FCC and RCC messages as well as the FSK control messages in the RVC can be checked for proper length, bit sequence and message parity. The duration of each digit sent as FSK data can also be measured. The length of the application of ST for various functions, such as Mobile Release, Hook Flash, Base Release, and Handoff can be measured. Also, the RF power level can be rechecked if either a command in the FVC to change the power level or an acknowledgment in the RVC is detected. A failure to observe a change in power level indicates that a fault might be present.

Many of these measurements can only be made when the cellular telephone performs a certain operation. They will, thus, not often be observed. To make these measurements, it might be necessary to increase the amount of time monitoring each cellular telephone call. It is also necessary to include fault diagnostic rules which account for the fact that these measurements will not be made on every call.

Further, it is not necessary that all of the identified parameters be measured to get the benefit of the invention. The preferred embodiment was described as testing an FDMA cellular network. TDMA and CDMA cellular telephone networks are also possible and the invention could be used equally well with these types of networks. These types of networks transmit data in digital form so that some of the measurements described above would not be needed. For example, the deviation in the baseband signal caused by a voice signal would not need to be measured.

Moreover, the invention has applicability outside of cellular telephone networks. It could be used with other types of wireless networks, such as specialized mobile radios, personal communications services and personal communications networks.

Also, it was described that the measurement unit determines which channel is in use by each MIN by monitoring transmissions to cellular telephones. The same information might be obtained by a computer interface between base station controller 118 and microprocessor 216 or by a computer link between network controller 124 and test system controller 126. Such a link might also be useful in scheduling demand tests when calls are placed to a service number. Test system controller 126 might receive information over the computer link about which cell site and channels are being used to route calls to the service center. Test system controller 126 could then send commands to the measurement unit 120 associated with that cell site.

The same computer link would be useful for other types of demand tests. For example, if a problem were reported with a particular MIN through other means than by dialing the service center with a cellular phone, test system controller 126 might determine whether the MIN was in use and then monitor the channels in use by that MIN.

Alternatively, it is not necessary that the microprocessor controlling each measurement unit 120 be separate from computers within base station 118. The same functionality can be obtained by programming a computer within base station controller 118.

Likewise, it is not necessary that test system controller 126 be a separate computer from network controller 124. The same functionality can be obtained by programming an existing computer within the network.

Therefore, the invention should be limited only by the spirit and scope of the appended claims.

What is claimed is:

1. In a cellular telephone network having a plurality of cell sites and at least one measurement unit capable of monitoring a predetermined number, which is at least two, of radio links between a cell site and a cellular telephone, a method of detecting faulty cellular telephones comprising the steps of:

a) preparing a list of cellular telephones which use the network and a priority for each cellular telephone on the list;

b) monitoring a control channel in the cellular telephone network to detect a call being initiated with a specific cellular telephone to determine the voice channel assigned for the call;

c) when less than the predetermined number of radio links is being monitored, monitoring the voice channel assigned for the call and taking a plurality of measurements on the radio link;

d) when the predetermined number of radio channels is being monitored, following a priority resolution procedure comprising the steps of:

i) determining the priority of the lowest priority cellular telephone being monitored;

ii) comparing the priority of the cellular telephone involved in the call being initiated to the priority of the lowest priority cellular telephone being monitored;

iii) when the priority of the cellular telephone involved in the call being initiated is higher than the priority of the lowest priority cellular telephone being monitored, preempting monitoring of the lowest priority call and monitoring the call being initiated and taking a plurality of measurements on the radio link; and e) processing the measurements made on a plurality of calls to detect faults in cellular telephones.

2. The method of detecting faulty cellular telephones of claim 1 wherein the step of preparing a priority for each cellular telephone comprises assigning a higher priority to cellular telephones used more than a predetermined amount than to those used less than the predetermined amount.

3. The method of detecting faulty cellular telephones of claim 1 wherein the step of preparing a priority for each cellular telephone comprises assigning a higher priority to cellular telephones which are suspected of being faulty than to those which are not suspected of being faulty.

4. The method of claim 3 wherein, before the step of assigning priorities, a plurality of cellular telephones are tested to determine which are suspected of being faulty.

5. A cellular telephone network of the type having a plurality of cell sites from which radio signals are sent to and received from a plurality of cellular telephones, comprising:

a) a plurality of measurement means, each measurement means associated with at least one cell site, for measuring parameters of radio signals sent by cellular telephones to the cell site;

b) test system controller means for controlling the operation of each measurement means, and for detecting faulty cellular telephones from measured parameters provided by each measurement means;

c) a plurality of communication links, each connecting one of the plurality of measurement means to the test system controller means; and d) a network controller means connected to the test system controller means, for controlling communication links between each cellular telephone and another telephone, and for detecting cellular telephone call failures, wherein the network controller means includes a database memory for storing names and addresses of users of each cellular telephone, for storing data related to how much time each cellular telephone is in use, and for storing data related to call failures.

6. A cellular telephone network of the type having a plurality of cell sites from which radio signals are sent to and received from a plurality of cellular telephones, comprising:

a) a plurality of measurement means, each measurement means associated with at least one cell site, for measuring parameters of radio signal sent by cellular telephones to the cell site;

b) test system controller means for controlling the operation of each measurement means, and for detecting faulty cellular telephones from measured parameters provided by each measurement means;

c) a plurality of communication links, each connecting one of the plurality of measurement means to the test system controller means; and d) a network controller means connected to the test system controller means, for controlling communication links between each cellular telephone and another telephone, and for detecting cellular telephone call failures, wherein the test system controller means includes a database memory for storing data derived from both the measured parameters and the detected call failures, and wherein the test system controller means uses the stored data to analyze faults detected in the cellular telephone network.

* * * * *